US008583552B2

(12) United States Patent
Votaw et al.

(10) Patent No.: US 8,583,552 B2
(45) Date of Patent: Nov. 12, 2013

(54) PROCESSING PAYMENT TRANSACTIONS BETWEEN ENTERPRISE RESOURCE PLANNING SYSTEMS

(75) Inventors: Elizabeth S. Votaw, Potomac, MD (US); Orlando O. Atienza, Charlotte, NC (US); Robert B. Walker, Waxhaw, NC (US); Clement M. Mazgelis, Bolton, CT (US); Jim L. Jenkins, Stanley, NC (US)

(73) Assignee: Bank of America Corporation, Charlotte, NC (US)

( * ) Notice: Subject to any disclaimer, the term of this patent is extended or adjusted under 35 U.S.C. 154(b) by 668 days.

(21) Appl. No.: 12/619,114

(22) Filed: Nov. 16, 2009

(65) Prior Publication Data

US 2011/0119179 A1    May 19, 2011

(51) Int. Cl.
*G06Q 40/00* (2012.01)
(52) U.S. Cl.
USPC .......................................................... 705/40
(58) Field of Classification Search
USPC .......................................................... 705/40
See application file for complete search history.

(56) References Cited

U.S. PATENT DOCUMENTS

| | | | |
|---|---|---|---|
| 6,826,542 B1 * | 11/2004 | Virgin et al. ..................... | 705/34 |
| 7,509,288 B2 | 3/2009 | Bennett et al. | |
| 2001/0025262 A1 * | 9/2001 | Ahmed ........................... | 705/33 |
| 2003/0220855 A1 * | 11/2003 | Lam et al. ....................... | 705/34 |
| 2005/0177476 A1 | 8/2005 | McCandless et al. | |
| 2009/0089194 A1 | 4/2009 | Mathis et al. | |

OTHER PUBLICATIONS

Notification of Transmittal of the International Search Report and the Written Opinion of the International Searching Authority, or the Declaration for PCT/US10/56787 (9 pages), Feb. 1, 2011.
Maria Bruno-Britz; *Wells Fargo Adapter Offers Clients Payments Automation*; 3 pages, Feb. 2, 2009.
Wells Fargo; Treasury Management; Wells Fargo Adapter; *Leverage your Oracle E-Business Suite Technology Investment to Streamline and Automate your Payment Processing Quickly and Affordably*; 2 pages, Aug. 2009.
Wells Fargo; Wells Fargo Adapter; *Making Payments Automation Affordable for Organizations of all Sizes*; 2 pages, Nov. 12, 2009.

* cited by examiner

*Primary Examiner* — Jessica Lemieux
(74) *Attorney, Agent, or Firm* — Michael A. Springs (57) ABSTRACT

In some embodiments, a method for processing a payment transaction comprises receiving, by a payor an invoice generated from a first enterprise resource planning (ERP) system operated by a payee. The first ERP system formatted the invoice in a first format. The invoice is stored in a second format compatible with a second ERP system. The invoice has been converted from the first format to the second format, which is different from the first format. Approval of the invoice is received through the second ERP system. Authorization instructing a financial institution to transmit a payment to the payee is generated and transmitted to the financial institution. Confirmation of the payment to the payee is generated and transmitted to the payee.

12 Claims, 4 Drawing Sheets

PROCESSING PAYMENT TRANSACTIONS BETWEEN ENTERPRISE RESOURCE PLANNING SYSTEMS

TECHNICAL FIELD

The present disclosure relates generally to transaction processing and more specifically to a system and method for processing payment transactions between enterprise resource planning systems.

BACKGROUND

An enterprise resource planning (ERP) system includes a software package configured to manage information and/or functions of a commercial enterprise. Some ERP systems include multiple software modules. ERP modules may access one or more databases that store ERP data for the various software modules. There are numerous ERP systems available in a variety of formats and configurations from a variety of providers, and the different ERP systems may be incompatible.

SUMMARY

In accordance with the present disclosure, the disadvantages and problems associated with prior enterprise resource planning (ERP) systems have been substantially reduced or eliminated.

In some embodiments, a method for processing a payment transaction comprises receiving, by a payor an invoice generated from a first ERP system operated by a payee. The first ERP system formatted the invoice in a first format. The invoice is stored in a second format compatible with a second ERP system. The invoice has been converted from the first format to the second format, which is different from the first format. Approval of the invoice is received through the second ERP system. Authorization instructing a financial institution to transmit a payment to the payee is generated and transmitted to the financial institution. Confirmation of the payment to the payee is generated and transmitted to the payee.

In some embodiments, a method for processing a payment transaction comprises generating at a payee an invoice using a first ERP system. The invoice is formatted in a first format compatible with the first ERP system. The invoice is transmitted to the payor. Confirmation of a payment from the payor is received. The payor generated the confirmation using a second ERP system in a second format different from the first format. The confirmation is stored in the first format. The confirmation has been converted from the second format to the first format compatible with the first ERP system. The confirmation is posted to the first ERP system.

In some embodiments, a method for processing a payment transaction comprises receiving by a payor an invoice. A payee generated the invoice by generating an electronic representation of a paper invoice. The invoice is stored in a format compatible with an ERP system. The invoice has been converted from the electronic representation to a format compatible with the ERP system. The format is different from the electronic representation generated by the payee. Approval is received through the ERP system. Authorization instructing a financial institution to transmit a payment to the payee is generated and transmitted to the financial institution. Confirmation of the payment to the payee is generated and transmitted to a viewing platform accessible by the payee.

Certain embodiments of the invention may provide one or more technical advantages. A technical advantage of one embodiment may include the capability to process payment transactions between entities with different ERP systems. Another technical advantage of one embodiment may include the capability to integrate a payor's payment process and a payee's receiving process. Yet another technical advantage of one embodiment may include the capability to process payment transactions between entities with different ERP systems without issuing paper checks and invoices. Yet another technical advantage of one embodiment may include the capability to reduce processing time of a payment transaction between entities with different ERP systems.

Various embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its advantages, reference is now made to the following description taken in conjunction with the accompanying drawings, in which.

DETAILED DESCRIPTION

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

An enterprise resource planning (ERP) system may include any software package configured to manage information and/or functions of a commercial enterprise. Some ERP systems include multiple software modules. Example software modules may include, but are not limited to, product lifecycle management, supply chain management (e.g., purchasing, manufacturing, and distribution), warehouse management, project management, customer relationship management (e.g., sales and marketing, commissions, service, customer contact, call center support), sales order processing, online sales, financials (e.g., costing, billing, time and expense, performance units, activity management), human resources (e.g., payroll, training, time and attendance, rostering, benefits), and decision support systems.

ERP modules may access one or more databases that store ERP data for the various software modules. Example ERP data may generally include, but is not limited to: human resources master data (e.g., employee-related data from a human resources module, such as employee ID, first name, last name, email, position, skills, and rate); customer data (e.g., customer-related data, such as customer ID, name, country, city, state, street, and email); employee assignment data (e.g., assignment of employees to specific events or tasks, and including employee ID, start date, and finish date); capability master data (e.g., capabilities that are needed to perform tasks; may be used to identify areas for partnership and includes capability ID, capability name, description, capability category, category name, and category description); vendor data by capability (e.g., information about vendors and partners and the capability provided by them; includes vendor ID, name, capability ID, and capability name); skills data by employee (e.g., skill data stored for each employee; may be used to assign employees according to requirements and their skill and includes skills ID, skills name, and employee ID); position data by skills (e.g., positions defined by a human resources system, and includes position ID, description, skills, and rate); material master data (e.g., material-related information, including material number, description, unit of measure, and unit price); and/or any other suitable data.

ERP systems are available in a variety of formats and configurations from a variety of providers. Example ERP system providers may include, but are not limited to, Oracle, SAP, and Microsoft. ERP systems may also include custom implementations, which may include integration of multiple software products.

In one example, an organization implements an ERP system that includes modules for purchasing, sales, accounts payable, and accounts receivable. The ERP system may be configured to provide interoperability between the different modules. For example, if the organization completes a purchase from the vendor, the ERP system may register the purchase with the purchasing and accounts payable modules. When the vendor submits an invoice to the organization for payment, the ERP system may notify the purchasing module and generate a check. Some ERP systems may automate this procedure, whereas other ERP systems may request input and/or authorization from a human user.

A check may include any negotiable instrument instructing a financial institution to pay a specific amount of a specific currency from a specified demand account held in the maker/depositor's name with that financial institution. A financial institution may include any organization that engages in banking activities such as maintaining accounts (e.g., transaction accounts, or savings accounts), paying checks drawn by customers of the financial institution, and collecting checks deposited to customers' accounts.

In a second example, the organization sells product to a vendee. In this example, the ERP system may register the sale with the sales and accounts receivable modules. When the vendee submits payment to the organization, the ERP system notifies the sales and account receivables module. Some ERP systems may automate this procedure, whereas other ERP systems may request input and/or authorization from a human user.

In both of these examples, the organization and vendor/vendee exchange paper invoices and checks. However, processing payment transactions using paper invoices and checks is inefficient. ERP systems may require that paper transactions be manually entered, which may be time-consuming and prone to errors. Additionally, the organization must wait for the financial institution to process the paper checks before receiving actual payment.

In an effort to move away from a paper process, some financial institutions may convert the paper checks into an electronic format and process the checks electronically. However, these internal electronic processing systems may not be compatible with the organization's ERP system. Additionally, financial institutions may offer customers electronic bill payment features, such as through a web interface. Financial institutions may also communicate electronic money transfers using electronic funds transfers (EFTs), automated clearing house (ACH) transactions, or any other suitable procedure. However, electronic bill payment systems, EFTs, and ACH transactions may still require redundant work for the organization; data from the organization's ERP system must be manually entered into an interface or form accepted by the financial institution, such as part of the financial institution's web interface, because the ERP system cannot communicate directly with the financial institution.

Furthermore, ERP systems may be implemented in a variety of formats, and two different ERP systems may not be necessarily compatible. For example, ERP systems from Oracle and SAP may use different data formats, and Oracle ERP systems may not be configured to communicate with SAP ERP systems. Thus, if the organization and vendor use different ERP systems, then the vendor may not be able to transmit the invoice electronically to the organization in a format compatible with the organization's ERP system. Similarly, the organization may not be able to transmit electronic payment using the ERP system if the ERP system is not compatible with systems used by the financial institution and the vendor.

Figure 1:
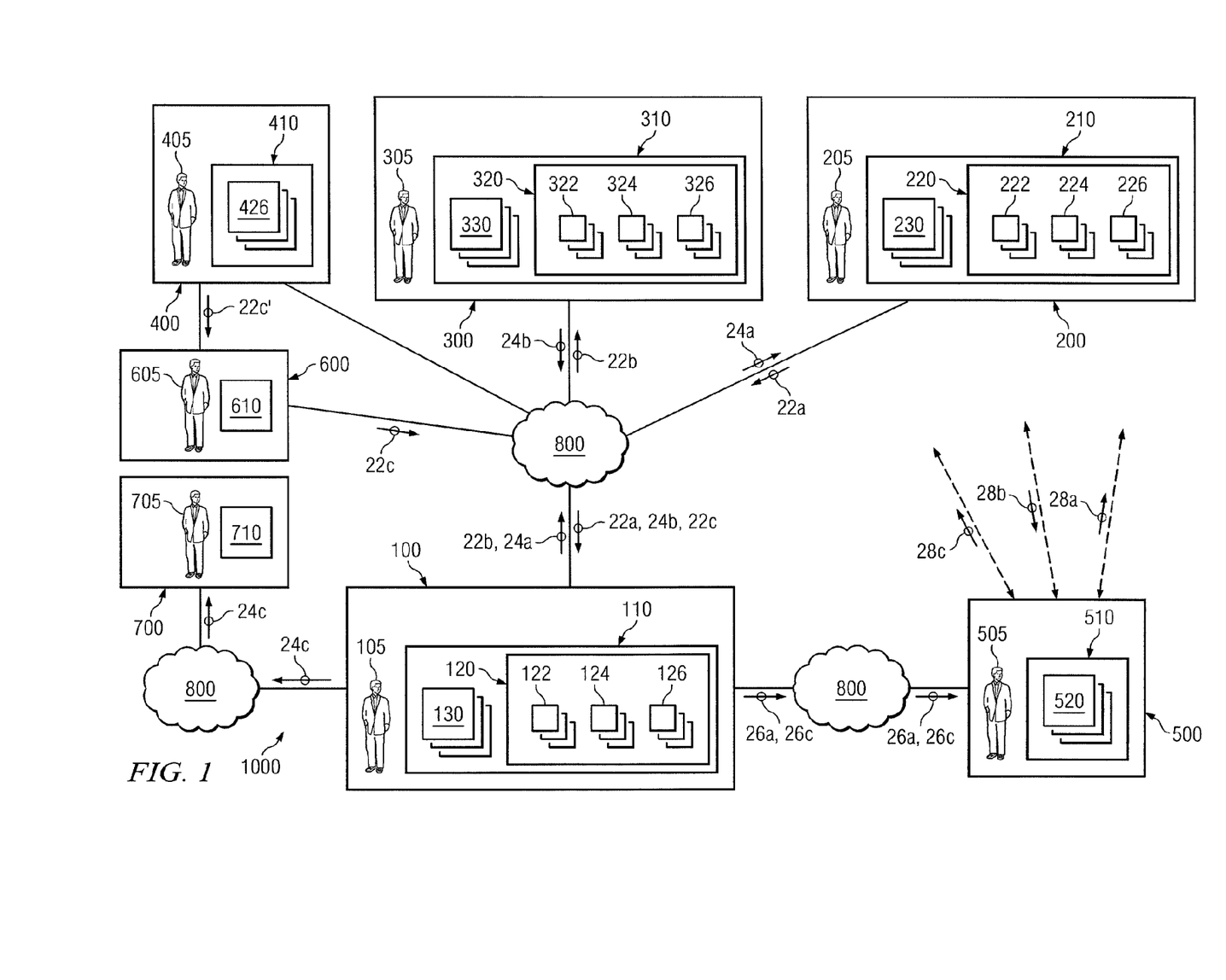
FIG. 1 shows a payment transaction processing system according to one embodiment.

Accordingly, teachings of certain embodiments recognize the ability to process payment transactions between entities with different ERP systems. FIG. 1 shows a payment transaction processing system 1000 according to one embodiment. In operation, system 1000 processes payment transactions between client 100 and transaction parties 200, 300, and 400. System 1000 may include more, fewer, or other clients and transaction parties that operate in any suitable capacity, such as a supplier, a customer, a vendor, a vendee, a payor, or a payee. As one example, teachings of certain embodiments recognize that client 100 may be both a supplier and customer with different transaction parties. System 1000 may also comprise one or more financial institutions 500, an invoice processing center 600, and a viewing platform 700, communicatively coupled by one or more networks 800.

In the illustrated embodiment, client 100 comprises a user 105 and a client system 110. One example of client system 110 may include computer 10 of FIG. 2. User 105 may include any individual, group of individuals, entity, machine, and/or mechanism that interacts with system 110. Examples of user 105 may include, but are not limited to, an executive, manager, accountant, engineer, technician, contractor, agent, employee, and/or any suitable representative of client 100. User 105 may also include non-representatives of client 100, such as customers and agents.

In certain embodiments, client system 110 includes one or more client ERP systems 120 and one or more plugins 130. ERP system 120 may access ERP data; example ERP data may include, but is not limited to, invoices 122, confirmations 124, and other company data 126. Invoices 122 may include any invoices generated by or received by client 100. Example invoices 122 may include representations of commercial documents indicating products and/or services, quantities of products and/or services, agreed prices for products and/or services, inspection records, packing lists, purchase orders, and payment terms for the agreed prices. Confirmations 124 may include any confirmations generated by or received by client 100. Example confirmations may include confirmations of payment of invoices, such as invoices 122 or other invoices. Other company data 126 may include any other ERP data accessed by ERP system 120, such as human resource data, customer data, employee assignment data, capability data, vendor data by capability, skills data by employee, position data by skills, material data, and/or any other suitable data.

Plugins 130 may include any logic that enables communication or translation between ERP system 120 and other ERP systems or other systems. Teachings of certain embodiments recognize the capability of plugins 130 to enable communication between ERP system 120 and a second ERP system of a different format. Such communication may include, but is not limited to, exchanges of payment information, invoices, inspections, purchase orders, and packing list data. Teachings of certain embodiments also recognize the capability of plugins 130 to enable ERP system 120 to process, receive, and transmit payments to and from a bank's payment processing system. Example embodiments of plugins 130 may include the embodiments described below with regard to FIG. 3.

In the illustrated embodiment, first transaction party 200 may include a user 205 and a first transaction party system 210. One example of first transaction party system 210 includes the computer 10 of FIG. 2. User 205 may include any individual, group of individuals, entity, machine, and/or mechanism that interacts with first transaction party system 210. Examples of user 205 may include, but are not limited to, an executive, manager, accountant, engineer, technician, contractor, agent, employee, and/or any suitable representative of first transaction party 200. User 205 may also include non-representatives of first transaction party 200, such as customers and agents.

In certain embodiments, first transaction party system 210 may include one or more ERP systems 220 and one or more plugins 230. ERP system 220 may access ERP data; example ERP data may include, but is not limited to, invoices 212, confirmations 224, and other company data 226. Invoices 212 may include any invoices generated by or received by first transaction party 200. Example invoices 212 may include representations of commercial documents indicating products and/or services, quantities of products and/or services, agreed prices for products and/or services, inspection records, packing lists, purchase orders, and payment terms for the agreed prices. Confirmations 224 may include any confirmations generated by or received by first transaction party 200. Example confirmations may include confirmations of payment of invoices, such as invoices 212 or other invoices. Other company data 226 may include any other ERP data accessed by ERP system 220, such as human resource data, customer data, employee assignment data, capability data, vendor data by capability, skills data by employee, position data by skills, material data, and/or any other suitable data.

Plugins 230 may include any logic that enables communication or translation between ERP system 220 and other ERP systems or other systems. Teachings of certain embodiments recognize the capability of plugins 230 to enable communication between ERP system 220 and a second ERP system of a different format. Such communication may include, but is not limited to, exchanges of payment information, invoices, inspections, purchase orders, and packing list data. Teachings of certain embodiments also recognize the capability of plugins 230 to enable ERP system 220 to process, receive, and transmit payments to and from a bank's payment processing system. Example embodiments of plugins 230 may include the embodiments described below with regard to FIG. 3.

In the illustrated embodiment, second transaction party 300 may include a user 305 and a second transaction party system 310. One example of second transaction party system 310 includes the computer 10 of FIG. 2. User 305 may include any individual, group of individuals, entity, machine, and/or mechanism that interacts with second transaction party system 310. Examples of user 305 may include, but are not limited to, an executive, manager, accountant, engineer, technician, contractor, agent, employee, and/or any suitable representative of second transaction party 300. User 305 may also include non-representatives of second transaction party 300, such as customers and agents.

In certain embodiments, second transaction party system 310 includes one or more ERP systems 320 and one or more plugins 330. ERP system 320 may access ERP data; example ERP data may include, but is not limited to, invoices 322, confirmations 324, and other company data 326. Invoices 322 may include any invoices generated by or received by second transaction party 300. Example invoices 322 may include representations of commercial documents indicating products and/or services, quantities of products and/or services, agreed prices for products and/or services, inspection records, packing lists, purchase orders, and payment terms for the agreed prices. Confirmations 324 may include any confirmations generated by or received by second transaction party 300. Example confirmations may include confirmations of payment of invoices, such as invoices 322 or other invoices. Other company data 326 may include any other ERP data accessed by ERP system 320, such as human resource data, customer data, employee assignment data, capability data, vendor data by capability, skills data by employee, position data by skills, material data, and/or any other suitable data.

Plugins 330 may include any logic that enables communication or translation between ERP system 320 and other ERP systems or other systems. Teachings of certain embodiments recognize the capability of plugins 330 to enable communication between ERP system 320 and a second ERP system of a different format. Such communication may include, but is not limited to, exchanges of payment information, invoices, inspections, purchase orders, and packing list data. Teachings of certain embodiments also recognize the capability of plugins 330 to enable ERP system 320 to process, receive, and transmit payments to and from a bank's payment processing system. Example embodiments of plugins 330 may include the embodiments described below with regard to FIG. 3.

In the illustrated embodiment, third transaction party 400 may include a user 405 and a third transaction party system 410. One example of third transaction party system 410 includes the computer 10 of FIG. 2. User 405 may include any individual, group of individuals, entity, machine, and/or mechanism that interacts with third transaction party system 410. Examples of user 405 may include, but are not limited to, an executive, manager, accountant, engineer, technician, contractor, agent, employee, and/or any suitable representative of third transaction party 400. User 405 may also include non-representatives of third transaction party 400, such as customers and agents.

As mentioned above, in the illustrated embodiment, third transaction party 400 includes a third transaction party system 410. However, in other embodiments, third transaction party 400 may not include a third transaction party system 410. For example, in some embodiments, user 405 may be a human user that performs business activities without the assistance of third transaction party system 410. For example, user 405 may generate handwritten invoices without using third transaction party system 410.

In the illustrated embodiment, third transaction party system 410 includes other systems for managing third transaction party data 426. For example, in some embodiments, user 405 interacts with third transaction system 410 to generate or process invoices without using an ERP system. As another example, user 405 conducts business activities without the assistance of third transaction system 410.

In some embodiments, financial institution 500 may include a user 505 and a financial institution system 510. One example of financial institution system 510 includes computer 10 of FIG. 2. User 505 may include any individual, group of individuals, entity, machine, and/or mechanism that interacts with financial institution system 510. Examples of user 505 may include, but are not limited to, a banker, teller, executive, manager, accountant, technician, contractor, agent, employee, and/or any suitable representative of financial institution 500. User 505 may also include non-representatives of financial institution 500, such as customers and agents.

In the example embodiment, financial institution system 510 includes account profile data 520. Account profile data 520 may include any suitable data regarding an account, including, but not limited to, account number, account balance, transaction history, and transaction status. For example, if a customer of financial institution system 510 issues a check from customer's account, account profile data 520 may identify the check, the status of the check (e.g., pending, posted, etc.), and the recipient of the check.

In the illustrated embodiment, client 100 has a preexisting relationship with financial institution 500. However, teachings of certain embodiments recognize that system 1000 may also include multiple financial institutions 500 or different financial institutions. For example, transaction parties 200, 300, and/or 400 have relationships with different financial institutions. In other embodiments, one or more of client 100 and transaction parties 200, 300, and 400 have relationships with the same financial institution, such as financial institution 500.

In some embodiments, invoice processing center 600 includes a user 605 and/or an invoice processing system 610. User 605 may include any person or entity suitable to perform operations of invoice processing center 600. One example of invoice processing system 610 includes computer 10 of FIG. 2.

In operation, invoice processing center 600 manages incoming invoices. In some embodiments, invoice processing center 600 manages incoming invoices from arrival to post. For example, the invoice processing center 600 receives the invoice, classifies the invoice into various categories, and forwards the invoice to the responsible person for that particular invoice.

Invoice processing center 600 may be affiliated with a variety of parties. For example, client 100, transaction parties 200, 300, and 400, and/or financial institution 500 may operate invoice processing center 600. A third-party operator also may operate invoice processing center 600.

In some embodiments, user 605 performs one or more operations of the invoice processing center 600. Also, in some embodiments, invoice processing system 610 may automate one or more operations of the invoice processing center 600. For example, invoice processing system 610 may be operable to record invoice data in an electronic format. In other embodiments, invoice processing system 610 may provide an interface, such as through a website, that allows a party to upload invoice data into an electronic format.

In some embodiments, viewing platform 700 may include a user 705 and/or a viewing system 710. Viewing platform 700 may display payment confirmations to non-ERP systems. User 705 may include any person or entity suitable to perform operations of the viewing platform 700. One example of viewing system 710 includes computer 10 of FIG. 2.

Viewing platform 700 may be affiliated with a variety of parties. For example, client 100, transaction parties 200, 300, and 400, and/or financial institution 500 may operate viewing platform 700. A third-party operator also may operate viewing platform 700.

In some embodiments, user 705 performs one or more operations of the viewing platform 700. For example, in one embodiment, viewing platform 700 may generate and/or transmit a paper payment confirmation. Also, in some embodiments, confirmation viewing system 710 may automate one or more operations of the viewing platform 700. For example, in operation, confirmation viewing system 710 may be operable to generate and/or transmit an email copy of a confirmation. In other embodiments, confirmation viewing system 710 may provide an interface, such as through a website, that allows a party to view payment confirmations in an electronic format.

In some embodiments, network 800 may represent any number and combination of wireline and/or wireless networks suitable for data transmission. Network 800 may, for example, communicate internet protocol packets, frame relay frames, asynchronous transfer mode cells, and/or other suitable information between network addresses. Network 800 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding.

System 1000 may include one or more networks 800. For example, FIG. 1 shows three networks 800. However, teachings of certain embodiments recognize that more or fewer networks 800 may be used. Further, teachings of certain embodiments also recognize that communications over network 800 is one example of a mechanism for communicating between parties, and any suitable mechanism may be used.

In operation, system 1000 may be operable to process transactions between two or more parties. In an exemplary embodiment of operation, client 100 and first transaction party 200 engage in a business transaction. First transaction party 200 generates an invoice 22a using ERP system 220. In some embodiments, ERP system 220 formats invoice 22a in a proprietary format. An example of a proprietary format may include a data format specific to a particular ERP vendor, such as Oracle, SAP, or Microsoft.

First transaction party 200 submits invoice 22a to client 100 for payment. For example, in one embodiment, first transaction party 200 communicates invoice 22a to client 100 over network 800. In some embodiments, ERP system 120 receives invoice 22a, and information from invoice 22a updates data associated with ERP system 120, such as accounting or department data. If client 100 uses a different ERP system 120 that does not accept the proprietary format of ERP system 220, teachings of certain embodiments recognize the ability to translate or convert invoice 22a into a format accepted by ERP system 120.

In some embodiments, plugins 130 and/or 230 convert invoice 22a. In some embodiments, plugin 230 converts invoice 22a before first transaction party 200 transmits invoice 22a across network 800 to client 100. In other embodiments, first transaction party 200 transmits invoice 22a to client 100 without conversion; upon receipt, client 100 converts invoice 22a using plugin 130. In some embodiments, plugin 230 converts invoice 22a into an intermediate format, and plugin 130 converts the invoice from the intermediate format into a format acceptable by ERP system 120. The intermediate format may represent a standardized data format readable by multiple clients, transaction parties, financial institutions, ERP systems, and/or plugins coupled to ERP systems.

Upon receipt of invoice 22a, client 100 may use ERP system 120 to approve invoice 22a for payment. For example, invoice 22a may be approved upon input from user 105, or invoice 22a may be approved by using an automated process of client system 110 and/or ERP system 120.

Client 100 may transmit authorization 26a to financial institution 500. Authorization 26a may include authorization to transmit a payment amount 28a from client 100 to first transaction party 200. For example, in one embodiment, client 100 may have an account with financial institution 500; in this example, client 100 authorizes financial institution 500 to deduct a payment amount from the account and transmit payment amount 28a to the first transaction party 200. In some embodiments, authorization 26a may include instructions for financial institution 500 to transmit payment amount 28a to an account designated by first transaction party 200. For example, financial institution 500 may execute an EFT or ACH transaction with a second financial institution that maintains a designated account of first transaction party 200. If client 100 and first transaction party 200 both maintain accounts with financial institution 500, then financial institution 500 may debit an account of client 100 and credit an account of first transaction party 200 using any suitable internal or external procedure.

In some embodiments, authorization 26a may be generated using ERP system 120. For example, authorization 26a may be generated upon input from user 105, or authorization 26a may be generated by using an automated process of client system 110 and/or ERP system 120. In one example embodiment, ERP system 120 automatically generates and transmits authorization 26a upon approval of invoice 22a.

In some embodiments, client 100 generates a confirmation 24a using ERP system 120. In one example embodiment, confirmation 24a confirms payment of invoice 22a, such as by identifying invoice 22a and payment amount 26a to first transaction party 200. In some embodiments, ERP system 120 formats the confirmation 24a in a proprietary format. An example of a proprietary format may include a data format specific to a particular ERP vendor, such as Oracle, SAP, or Microsoft.

In some embodiments, client 100 may transmit confirmation 24a to financial institution 500. For example, in one embodiment, client 100 communicates confirmation 24a to first transaction party 200 over network 800. In some embodiments, ERP system 220 may receive confirmation 24a, and information from confirmation 24a updates data associated with ERP system 220, such as accounting or department data. If client 100 uses a different ERP system 120 that does not accept the proprietary format of ERP system 220, then teachings of certain embodiments recognize the ability to translate or convert confirmation 24a into a format accepted by ERP system 220.

In some embodiments, plugins 130 and/or 230 convert confirmation 24a. In some embodiments, plugin 130 converts confirmation 24a before client 100 transmits confirmation 24a across network 800 to first transaction party 200. In other embodiments, client 100 transmits confirmation 24a to first transaction party 200 without conversion; upon receipt, first transaction party 200 converts confirmation 24a using plugin 230. In some embodiments, plugin 130 converts confirmation 24a into an intermediate format, and plugin 230 converts confirmation 24a from the intermediate format into a format acceptable by ERP system 220. The intermediate format may represent a standardized data format readable by multiple clients, transaction parties, financial institutions, ERP systems, and/or plugins coupled to ERP systems.

In another exemplary embodiment, client 100 and second transaction party 300 engage in a business transaction. Client 100 generates an invoice 22b using ERP system 120. In some embodiments, ERP system 120 formats the invoice 22b in a proprietary format. An example of a proprietary format may include a data format specific to a particular ERP vendor, such as Oracle, SAP, or Microsoft.

Client 100 submits invoice 22b to second transaction party 300 for payment. For example, in one embodiment, client 100 communicates invoice 22b to second transaction party 300 over network 800. In some embodiments, ERP system 320 receives invoice 22b, and information from invoice 22b updates data associated with ERP system 320, such as accounting or department data. If second transaction party 300 uses a different ERP system 320 that does not accept the proprietary format of ERP system 120, teachings of certain embodiments recognize the ability to translate or convert invoice 22b into a format accepted by ERP system 320.

In some embodiments, plugins 130 and/or 330 convert invoice 22b. In some embodiments, plugin 130 converts invoice 22b before client 100 transmits invoice 22b across network 800 to second transaction party 300. In other embodiments, client 100 transmits invoice 22b to second transaction party 300 without conversion; upon receipt, second transaction party 300 converts invoice 22b using plugin 330. In some embodiments, plugin 130 converts invoice 22b into an intermediate format, and plugin 330 converts the invoice from the intermediate format into a format acceptable by ERP system 320. The intermediate format may represent a standardized data format readable by multiple clients, transaction parties, financial institutions, ERP systems, and/or plugins coupled to ERP systems.

Upon receipt of invoice 22b, second transaction party 300 may use ERP system 320 to approve invoice 22b for payment. For example, invoice 22b may be approved upon input from user 105, or invoice 22b may be approved using an automated process of client system 110 and/or ERP system 320.

Second transaction party 300 may submit a payment 28b to client 100. In one embodiment, second transaction party 300 transmits authorization 26b to a second financial institution (not shown). Authorization 26b may include authorization to transmit a payment amount 28b from second transaction party 300 to client 100. For example, in one embodiment, second transaction party 300 may have an account with the second financial institution; in this example, second transaction party 300 authorizes the second financial institution to deduct a payment amount from the account and transmit payment amount 28b to the client 100. In some embodiments, authorization 26b to transmit a payment from second transaction party 300 to client 100 may include instructions for the second financial institution to transmit payment amount 28b to an account designated by client 100. For example, the second financial institution may execute an EFT or ACH transaction with a financial institution 500 that maintains a designated account of client 100. If client 100 and second transaction party 300 both maintain accounts with financial institution 500, then financial institution 500 may debit an account of second transaction party 300 and credit an account of client 100 using any suitable internal or external procedure.

In some embodiments, authorization 26b may be generated using ERP system 320. For example, authorization 26b may be generated upon input from user 105, or authorization 26b may be generated using an automated process of client system 110 and/or ERP system 320. In one example embodiment, ERP system 320 automatically generates and transmits authorization 26b upon approval of invoice 22b.

In some embodiments, second transaction party 300 generates a confirmation 24b using ERP system 320. In one example embodiment, confirmation 24b confirms payment of invoice 22b, such as by identifying invoice 22b and payment amount 26b to client 100. In some embodiments, ERP system 320 formats confirmation 24b in a proprietary format. An example of a proprietary format may include a data format specific to a particular ERP vendor, such as Oracle, SAP, or Microsoft.

In some embodiments, second transaction party 300 transmits confirmation 24b to financial institution 200. For example, in one embodiment, second transaction party 300 communicates confirmation 24b to client 100 over network 800. In some embodiments, ERP system 120 receives confirmation 24b, and information from confirmation 24b updates data associated with ERP system 120, such as accounting or department data. If second transaction party 300 uses a different ERP system 320 that does not accept the proprietary format of ERP system 120, then teachings of certain embodiments recognize the ability to translate or convert the confirmation 24b into a format accepted by the ERP system 120.

In some embodiments, plugins 330 and/or 130 convert confirmation 24b. In some embodiments, plugin 330 converts confirmation 24b before second transaction party 300 transmits confirmation 24b across network 800 to client 100. In other embodiments, second transaction party 300 transmits confirmation 24b to client 100 without conversion; upon receipt, client 100 converts confirmation 24b using plugin 130. In some embodiments, plugin 330 converts confirmation 24b into an intermediate format, and plugin 130 converts confirmation 24b from the intermediate format into a format acceptable by ERP system 120. The intermediate format may represent a standardized data format readable by multiple transaction parties, financial institutions, ERP systems, and/or plugins coupled to ERP systems.

In another exemplary embodiment, client 100 and third transaction party 300 engage in a business transaction. In this example, third transaction party 400 generates an invoice 22c' without an ERP system. For example, invoice 22c' may be a paper invoice or an electronic invoice generated using a non-ERP system.

Invoice processing center 600 may receive invoice 22c'; however, other examples may omit invoice processing center 600. Invoice processing center 600 may, for example, record data from invoice 22c' into an electronic format 22c. For example, invoice processing center 600 facilitates data entry from a paper invoice 22c' or provide an interface, such as a website, that allows a party to upload invoice data into an electronic format.

The electronic format may be any suitable format, such as a proprietary format. An example of a proprietary format may include a data format specific to a particular ERP vendor, such as Oracle, SAP, or Microsoft. In some examples, the electronic format may be an intermediate format. The intermediate format may represent a standardized data format readable by multiple clients, transaction parties, financial institutions, ERP systems, and/or plugins coupled to ERP systems.

Invoice processing center 600 transmits invoice 22c to client 100. For example, in one embodiment, invoice processing center 600 communicates invoice 22c to client 100 over network 800. In some embodiments, ERP system 120 receives invoice 22c, and information from invoice 22c updates data associated with ERP system 120, such as accounting or department data. If client 100 may use a different ERP system 120 that does not accept the electronic format of the invoice processing center 600 then teachings of certain embodiments recognize the ability to translate or convert invoice 22c into a format accepted by ERP system 120. In some embodiments, plugin 130 converts invoice 22c into a format acceptable by ERP system 120.

Upon receipt of invoice 22c, client 100 may use ERP system 120 to approve invoice 22c for payment. For example, invoice 22c may be approved upon input from user 105, or invoice 22c may be approved by using an automated process of client system 110 and/or ERP system 120.

Client 100 may transmit authorization 26c to financial institution 500. Authorization 26c may include authorization to transmit a payment amount 28c from client 100 to third transaction party 400. For example, in one embodiment, client 100 may have an account with financial institution 500; in this example, client 100 authorizes financial institution 500 to deduct a payment amount from the account and transmit payment amount 28c to third transaction party 400. In some embodiments, authorization 26c to transmit a payment from client 100 to third transaction party 400 may include instructions for the financial institution 500 to transmit payment amount 28c to an account designated by third transaction party 400. For example, financial institution 500 may execute an EFT or ACH transaction with a second financial institution that maintains a designated account of the third transaction party 400. If client 100 and third transaction party 400 both maintain accounts with financial institution 500, then financial institution 500 may debit an account of client 100 and credit an account of third transaction party 400 using any suitable internal or external procedure.

In some embodiments, authorization 26c may be generated using ERP system 120. For example, authorization 26c may be generated upon input from user 105, or authorization 26c may be generated by using an automated process of client system 110 and/or ERP system 120. In one example embodiment, ERP system 120 automatically generates and transmits authorization 26c upon approval of invoice 22c.

In some embodiments, client 100 generates a confirmation 24c using ERP system 120. In one example embodiment, confirmation 24c confirms payment of the invoice 22c, such as by identifying invoice 22c and payment amount 26c to third transaction party 400. In some embodiments, ERP system 120 formats the confirmation 24c in a proprietary format. An example of a proprietary format may include a data format specific to a particular ERP vendor, such as Oracle, SAP, or Microsoft. In some embodiments, ERP system 120 formats confirmation 24c in an intermediate format or in any other format readable by a viewing platform 700. In embodiments in which confirmation 24c does not accept a proprietary format, plugin 130 or any other suitable mechanism convert confirmation 24c into a format acceptable by viewing platform 700.

In the example embodiment shown, client 100 transmits confirmation 24c to viewing platform 700. Viewing platform 700 may allow a party, such as the third transaction party 400, to view confirmation 24c. For example, in some embodiments, viewing platform 700 may generate a paper confirmation, an email confirmation, and/or a website page displaying data from confirmation 24c.

Figure 2:
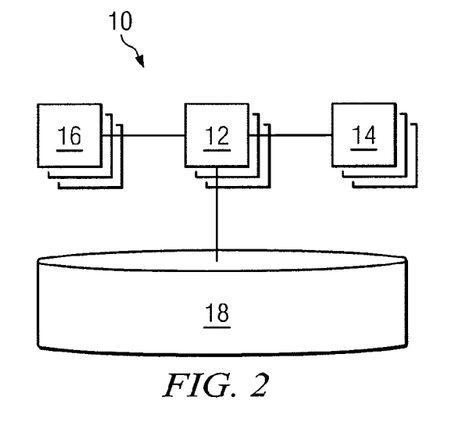
FIG. 2 shows a computer system according to one embodiment.

FIG. 2 shows one embodiment of a computer system 10. Computer system 10 may include processors 12, input/output devices 14, communications links 16, and memory 18. In other embodiments, computer system 10 may include more, less, or other components.

Computer system 10 may be operable to perform one or more operations of various embodiments. Although the embodiment shown in FIG. 2 provides one example of computer system 10 that may be used with other embodiments, such other embodiments may additionally utilize computers other than the computer system 10. Additionally, embodiments may also employ multiple computer systems 10 or other computers networked together in a computer network. Multiple computer systems 10 or other computers may be networked through the Internet and/or in a client-server network. Embodiments of the invention may also be used with a combination of separate computer networks each linked together by a private or a public network.

Several embodiments may include processors 12 operable to execute logic contained within a medium. Examples of processor 12 include one or more microprocessors, one or more applications, and/or other logic. Computer system 10 may include one or multiple processors 12.

Several embodiments may include one or more input/output devices. Input/output devices 14 may include any device or interface operable to enable communication between computer system 10 and external components, including communication with a user or another system. Example input/output devices 14 may include, but are not limited to, a mouse, keyboard, display, and printer.

Communications links 16 may be connected to any number and combination of wireline and/or wireless networks suitable for data transmission. Communications links 16 may, for example, communicate internet protocol packets, frame relay frames, asynchronous transfer mode cells, and/or other suitable information between network addresses. Communications links 16 may be connected to a computer network or a variety of other communicative platforms including, but not limited to, a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. In one example embodiment, communications links 16 may be connected to one or more networks 800 of FIG. 1.

Several embodiments may include logic contained within a medium. Logic may include hardware, software, and/or other logic. Logic may be encoded in one or more tangible media and may perform operations when executed by a computer. Logic may include a computer program, software, computer executable instructions, and/or instructions capable of being executed by computer system 10. Example logic may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. The logic may also be embedded within any other suitable medium without departing from the scope of the invention.

The logic may be stored on a medium such as the memory 18. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

For example, if system 10 represents client system 110, memory 18 may include ERP system 120, invoices 122, confirmations 124, other company data 126, and/or plugins 130. As another example, if system 10 represents first transaction party 210, memory 18 may include ERP system 220, invoices 222, confirmations 224, other company data 226, and/or plugins 230. As yet another example, if system 10 represents second transaction party system 310, memory 18 may include ERP system 320, invoices 322, confirmations 324, other company data 326, and/or plugins 330. As yet another example, if system 10 represents third transaction party system 410, memory 18 may include third transaction party data 426. As yet another example, if system 10 represents financial institution 500, memory 18 may include account profile data 520.

Figure 3:
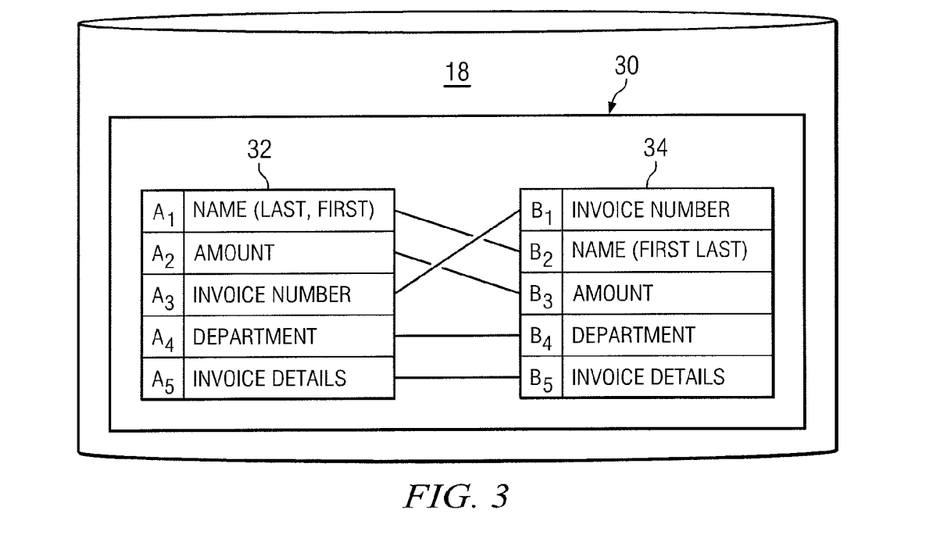
FIG. 3 shows a memory that includes a plugin for converting ERP data between formats using a plugin.

FIG. 3 shows a memory 18 that includes a plugin 30 for converting ERP data between formats. However, teachings of certain embodiments recognize that any suitable mechanism for converting ERP data between formats may be used.

Plugin 30 includes an incoming ERP data set 32 and an outgoing ERP data set 34. In one example embodiment, ERP data sets 32 and 34 represent ERP data in different proprietary formats. An example of a proprietary format may include a data format specific to a particular ERP vendor, such as Oracle, SAP, or Microsoft. In another example, either the ERP data set 32 or ERP data set 34 may be formatted in an intermediate format. The intermediate format may represent a standardized data format readable by multiple clients, transaction parties, financial institutions, ERP systems, and/or plugins coupled to ERP systems.

Incoming ERP data 32 comprises a first set of data fields, illustrated as A1, A2, A3, A4, and A5. Outgoing ERP data 34 comprises a second set of data fields, labeled as B1, B2, B3, B4, and B5. In this example, each data field represents a particular data value. For example, data field A1 represents a person's name, whereas data field B1 represents an invoice number.

Plugin 30 may convert the incoming ERP data 32 into the outgoing ERP data 34 by mapping each data field in the first set to the corresponding data field in the second set. For example, in the illustrated embodiment, data field A1, which includes a person's name, maps to B2, which also includes a person's name. Using the same technique, data field A2 maps to data field B3, and data field A3 maps to data field B1.

In one embodiment, plugin 30 is preconfigured to recognize ERP data of a proprietary format. Referring to FIG. 1, in one embodiment, plugins 130 is preconfigured to recognize ERP data from ERP systems 220 and/or 320. In addition, plugins 130 may be preconfigured to recognize data in an intermediate format. For example, in FIG. 1, plugins 130, 230, and 330 may be configured to recognize data in an intermediate format. In one embodiment, plugins 130, 230, and 330 are standardized such that the plugins 130, 230, and 330 are configured to convert data between a standardized intermediate format and ERP systems 120, 220, and 320, respectively. If, for example, ERP systems 120, 220, and 320 are different proprietary ERP systems, then teachings of certain embodiments recognize that using a standardized intermediate format allows plugins 130 to recognize and read data transmitted from proprietary ERP systems 220 and 320 without being configured to recognize and read ERP data from ERP systems 220 and 320.

In some embodiments, plugin 30 recognizes data of a proprietary format upon receiving and/or sending data. For example, in one embodiment, plugin 130 receives ERP data, identifies the ERP system format associated with the ERP data (e.g., format associated with ERP systems 220 and 320), and converts the ERP data into a format recognizable by ERP system 120.

Returning to FIG. 3, if incoming ERP data 32 is in a proprietary format, teachings of certain embodiments recognize the capability of plugin 30 to search and locate data fields within incoming ERP data 32. In one embodiment, plugin 30 identifies the amount data field in incoming ERP data 32 by searching for data field A2. In one illustrative example, incoming ERP data 32 represents data fields A1-A5 separated by commas as follows:

A1,A2,A3,A4,A5

In this example, plugin 30 is configured to search incoming ERP data 32 for the name data field by locating the second data field separated by commas, represented by A2.

Teachings of certain embodiments recognize that mapping data fields may provide an efficient mechanism for translating between ERP systems. For example, many invoices from different ERP systems may include the common data fields (e.g., name, amount, invoice number, quantity, etc.), and plugin 30 may map each of these common data fields.

In addition to mapping data fields, teachings of certain embodiments recognize the capability to map data formats within a data field. For example, data field A1 represents a name as "last name, first name." A different ERP system, however, may represent a name as "first name last name," as shown in data field B2. Accordingly, teachings of certain embodiments recognize the capability to reformat data fields from a first ERP system into a format compliant with a different second ERP system.

Figure 4:
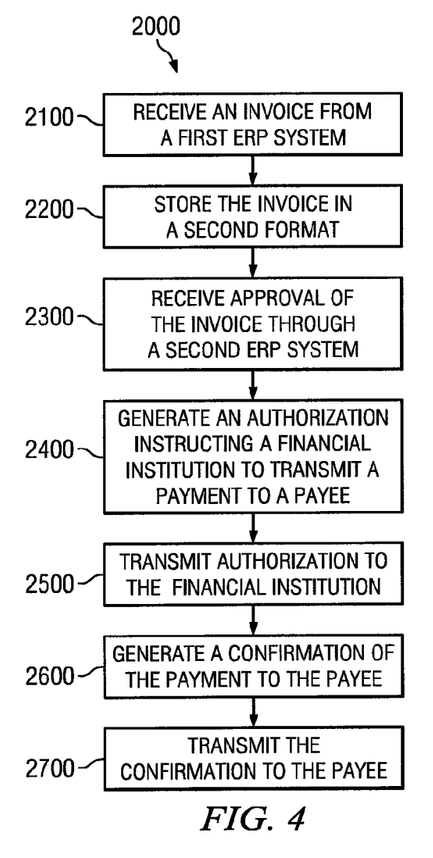
FIG. 4 shows a method for processing a payment transaction at a payor according to one embodiment.

FIG. 4 shows a method 2000 for processing a payment transaction at a payor according to one embodiment. In this exemplary embodiment, client 100 represents the payor, and first transaction party 200 represents a payee.

At step 2100, client 100 receives invoice 22a generated from ERP system 220 operated by first transaction party 200. Client 100 receives invoice 22a through a network interface, such as communication link 16. In one example, ERP system 220 formats invoice 22a in a format associated with ERP system 220.

At step 2200, client 100 stores invoice 22a with invoices 122 in a memory, such as memory 18. In one example, client 100 stores invoice 22a in a format associated with ERP system 120. In this example, the invoice 22a is converted from the format associated with ERP system 220 to the format associated with ERP system 120. In some embodiments, plugin 130 and/or plugin 230 may convert the invoice 22a from the format associated with ERP system 220 to the format associated with ERP system 120. In one example embodiment, plugin 230 may convert the invoice 22a from the format associated with ERP system 220 into an intermediate format, and plugin 130 may convert invoice 22a from the intermediate format into the format associated with ERP system 120.

In one example embodiment, converting the format of invoice 22a includes identifying one or more data fields in the format associated with ERP system 220, identifying one or more corresponding data fields in the format associated with ERP system 120, and mapping the one or more data fields in the format associated with ERP system 220 to the corresponding data fields in the format associated with ERP system 120. Similar mapping may occur with the intermediate format or any other suitable format.

At step 2300, ERP system 120 receives approval of the invoice. At step 2400, client 100 generates authorization 26a. Authorization 26a authorizes financial institution 500 to transmit payment amount 26a to first transaction party 200. At step 2500, client 100 transmits authorization 26a to financial institution 500. At step 2600, client 100 generates confirmation 24a. Confirmation 24a confirms transmission of authorization 26a and/or payment amount 28a. At step 2700, client 100 transmits confirmation 24a to first transaction party 200.

Figure 5:
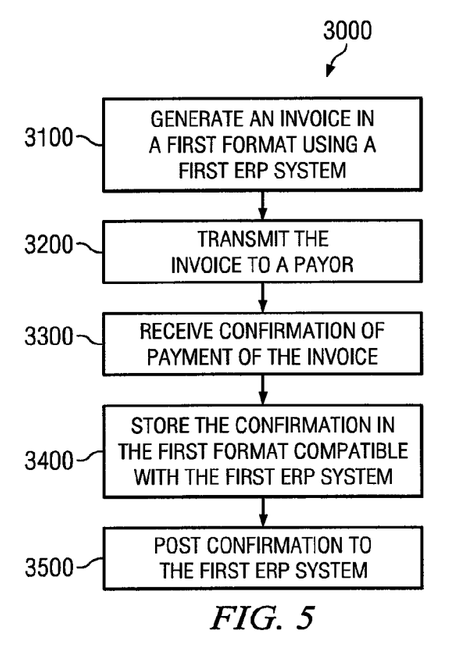
FIG. 5 shows a method for processing a payment transaction at a payee according to one embodiment.

FIG. 5 shows a method 3000 for processing a payment transaction at a payee according to one embodiment. In this exemplary embodiment, client 100 represents the payee, and second transaction party 200 represents a payor.

At step 3100, client 100 generates invoice 22b using ERP system 120. In one example, ERP system 120 formats invoice 22b in a format associated with ERP system 120. At step 3200, client 100 transmits invoice 22b to second transaction party 300 through a network interface, such as communication link 16.

At step 3300, client 100 receives confirmation 24b that second transaction party 300 has transmitted payment amount 28b to financial institution 500. In one example, the second transaction party 300 formatted confirmation 24b in a format associated with ERP system 320.

At step 3400, client 100 stores confirmation 24b with confirmations 124 in a memory, such as memory 18. In one example, client 100 stores confirmation 24b in a format associated with ERP system 120. In this example, confirmation 24b is converted from the format associated with ERP system 320 to the format associated with ERP system 120. In some embodiments, plugin 130 and/or plugin 330 may convert confirmation 24b from the format associated with ERP system 320 to the format associated with ERP system 120. In one example embodiment, plugin 230 may convert confirmation 24b from the format associated with ERP system 320 into an intermediate format, and plugin 130 may convert confirmation 24b from the intermediate format into the format associated with ERP system 120.

In one example embodiment, converting the format of confirmation 24b includes identifying one or more data fields in the format associated with ERP system 320, identifying one or more corresponding data fields in the format associated with ERP system 120, and mapping the one or more data fields in the format associated with ERP system 320 to the corresponding data fields in the format associated with ERP system 120. Similar mapping may occur with the intermediate format or any other suitable format.

At step 3500, confirmation 24b is posted to ERP system 120.

Figure 6:
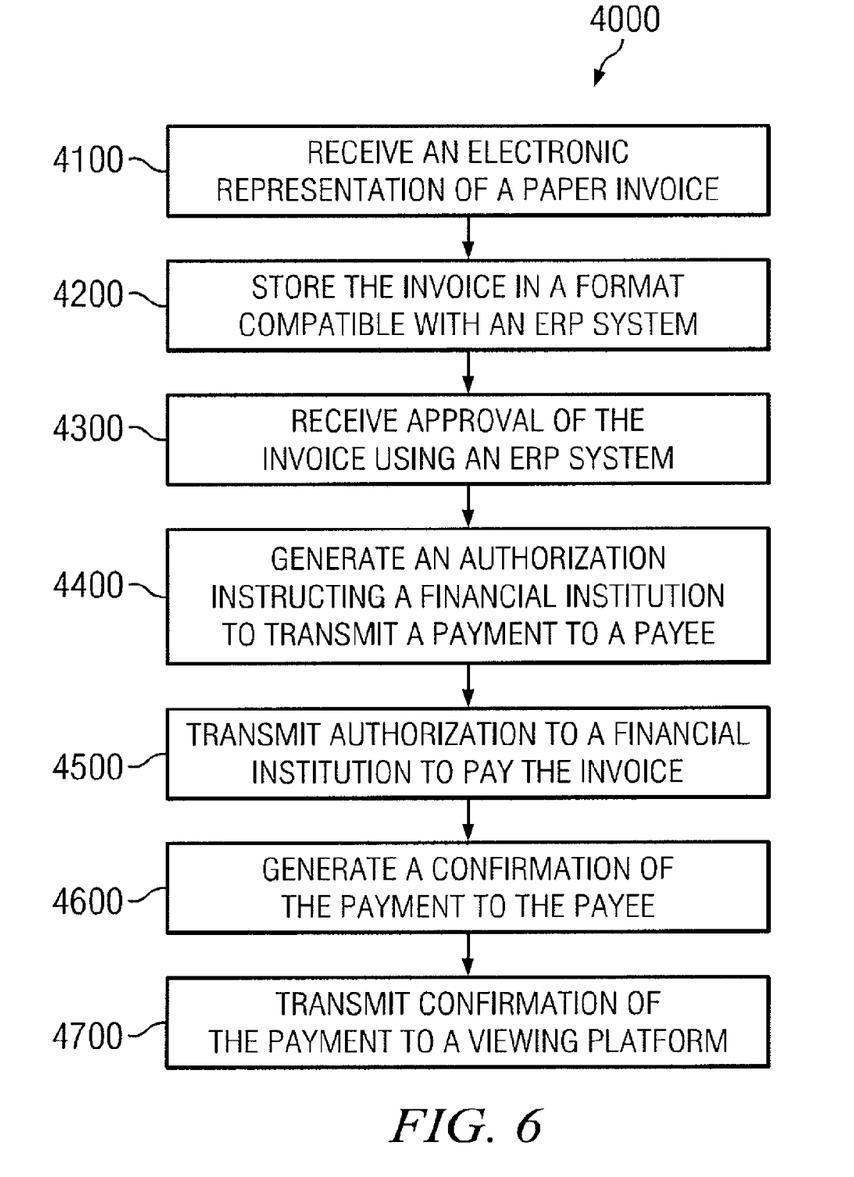
FIG. 6 shows a method for processing a payment transaction between a payor with an ERP system and a payee without an ERP system according to one embodiment.

FIG. 6 shows a method 4000 for processing a payment transaction between a payor with an ERP system and a payee without an ERP system according to one embodiment. In this exemplary embodiment, client 100 represents the payor, and third transaction party 400 represents the payee.

At step 4100, client 100 receives invoice 22c. In this example, invoice 22c is an electronic representation of a paper invoice. Client 100 receives invoice 22c through a network interface, such as communication link 16.

At step 4200, client 100 stores invoice 22c with invoices 122 in a memory, such as memory 18. In one example, client 100 stores invoice 22c in a format associated with ERP system 120. In this example, the invoice 22c is converted from the electronic representation to the format associated with ERP system 120. In some embodiments, plugin 130, third transaction party 400, and/or invoice processing center 600 may convert the invoice 22c from the electronic representation to the format associated with ERP system 120. In one example embodiment, third transaction party 400 and/or invoice processing center 600 may convert the invoice 22c from the electronic representation into an intermediate format, and plugin 130 may convert invoice 22c from the intermediate format into the format associated with ERP system 120.

At step 4300, ERP system 120 receives approval of the invoice. At step 4400, client 100 generates authorization 26c. Authorization 26c authorizes financial institution 500 to transmit payment amount 26c to third transaction party 400. At step 4500, client 100 transmits authorization 26c to financial institution 500. At step 4600, client 100 generates confirmation 24c. Confirmation 24c confirms transmission of authorization 26c and/or payment amount 28c.

At step 4700, client 100 transmits confirmation 24c to viewing platform 700. In one example embodiment, viewing platform 700 includes an electronic mail message transmitted to the third transaction party 400. In another example embodiment, viewing platform 700 includes a website accessible by the third transaction party 400.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A method for processing a payment transaction, comprising:
    generating, at a payee using one or more processors, an invoice using a first enterprise resource planning (ERP) system operated by the payee, wherein the invoice is formatted in a first format specific to the first ERP system;
    transmitting, using a network interface, the invoice to a payor in the first format;
    receiving, at the network interface, a confirmation of a payment from the payor, the payor having generated the confirmation using a second ERP system in a second format different from the first format and specific to the second ERP system;
    storing the confirmation in a memory in the first format, the confirmation having been converted from the second format to the first format; and
    posting, using one or more processors, the confirmation to the first ERP system.

2. The method of claim 1, wherein:
    the confirmation is received from the payor in the second format; and
    the confirmation is converted from the second format to the first format at the payee.

3. The method of claim 1, wherein:
    the confirmation is received from the payor in an intermediate format, the confirmation having been converted from the second format to the intermediate format at the payor and converted from the intermediate format to the first format at the payee.

4. The method of claim 1, wherein:
    the confirmation is received from the payor in the first format; and
    the confirmation is formatted from the second format to the first format at the payor prior to the transmitting of the confirmation.

5. The method of claim 1, wherein the invoice is transmitted to the payor in a selected one of the first format, an intermediate format, and the second format.

6. The method of claim 2, wherein the converting the confirmation from the second format to the first format comprises:
    identifying, using one or more processors, one or more data fields in the confirmation of the second format;
    identifying, using one or more processors, one or more corresponding data fields in the first format; and
    mapping, using one or more processors, the one or more data fields in the confirmation of the second format to the corresponding data fields in the first format.

7. A system for processing a payment transaction, comprising:
    a first enterprise resource planning (ERP) system comprising logic encoded on a computer readable storage medium such that, when executed by a processor, is operable to:
        generate, at a payee using one or more processors, an invoice using a first enterprise resource planning (ERP) system operated by the payee, wherein the invoice is formatted in a first format specific to the first ERP system;
        transmit, using a network interface, the invoice to a payor in the first format;
        receive, at the network interface, a confirmation of a payment from the payor, the payor having generated the confirmation using a second ERP system in a second format different from the first format and specific to the second ERP system;
        store the confirmation in a memory in the first format, the confirmation having been converted from the second format to the first format; and
        post, using one or more processors, the confirmation to the first ERP system.

8. The system of claim 7, wherein:
    the confirmation is received from the payor in the second format; and
    the confirmation is converted from the second format to the first format at the payee.

9. The system of claim 7, wherein:
    the confirmation is received from the payor in an intermediate format, the confirmation having been converted from the second format to the intermediate format at the payor and converted from the intermediate format to the first format at the payee.

10. The system of claim 7, wherein:
    the confirmation is received from the payor in the first format; and
    the confirmation is formatted from the second format to the first format at the payor prior to the transmitting of the confirmation.

11. The system of claim 7, wherein the invoice is transmitted to the payor in a selected one of the first format, an intermediate format, and the second format.

12. The system of claim 8, wherein the logic, when executed by the processor, being further operable to convert the invoice from the second format to the first format by:
   identifying one or more data fields in the confirmation of the second format;
   identifying one or more corresponding data fields in the first format; and
   mapping the one or more data fields in the confirmation of the second format to the corresponding data fields in the first format.

* * * * *